United States Patent [19]
Freeman et al.

[11] Patent Number: 5,652,744
[45] Date of Patent: Jul. 29, 1997

[54] SINGLE SURFACE DIFFRACTIVE ELEMENT FOR OPTICAL PICKUP HEADS

[75] Inventors: Mark O. Freeman; Hung-Te Lee, both of Hsinchu, Taiwan

[73] Assignee: Industrial Technology Research Institute, Hsinchu, Taiwan

[21] Appl. No.: 598,659

[22] Filed: Feb. 8, 1996

[51] Int. Cl.$^6$ .................................................. G11B 7/00
[52] U.S. Cl. .................... 369/109; 369/44.23; 369/103
[58] Field of Search ................................. 369/103, 109, 369/110, 112, 44.23, 44.37, 44.41, 44.25, 44.11, 118, 44.24, 44.32

[56] References Cited

U.S. PATENT DOCUMENTS

| | | | |
|---|---|---|---|
| 4,358,200 | 11/1982 | Heemskerk et al. | |
| 5,111,449 | 5/1992 | Kurata et al. | |
| 5,511,059 | 4/1996 | Brazas, Jr. | 369/109 |
| 5,523,993 | 6/1996 | Freeman | 369/103 X |

FOREIGN PATENT DOCUMENTS

| | | | |
|---|---|---|---|
| 56-57013 | 5/1981 | Japan . | |
| 1149237 | 6/1989 | Japan | 369/103 |
| 540958 | 2/1993 | Japan | 369/103 |

*Primary Examiner*—P. W. Huber
*Attorney, Agent, or Firm*—Ladas & Parry

[57] ABSTRACT

An optical pickup device including a lighting source, a condensing apparatus, a diffracting means, and a light detector. The light source generates and emits a light beam to the diffracting means. The diffracting means includes a center region and an outer region which encloses the center region. As the light travels from the light source towards the optical storage medium the main zero-order beam which reads the information on the disk encounters only the center region of the diffracting means while the two sub-beams used for track following are created as +1 and −1 diffraction orders from the outer region of the diffracting means. The three beams reflected from the recording medium all pass through the center region of the diffracting means and are diffracted in the direction of the detector therefrom. The light detector consists of multiple detector elements which convert the light that shines upon them after reflection from the recording medium into electronic signals containing the information that was recorded on the medium.

6 Claims, 10 Drawing Sheets

SINGLE SURFACE DIFFRACTIVE ELEMENT FOR OPTICAL PICKUP HEADS

BACKGROUND OF THE INVENTION

1. Field of the Invention

The present invention relates to an optical pickup device, and more specifically, to a single surface holographic optical element (HOE) that implements the functions of generating satellite beams to be used for tracking and creating a focus error signal.

2. Description of Prior Art

Referring to FIG. 1 (prior art), a conventional optical pickup device, which is similar to that disclosed in Japanese Application Laid-Open No. 56-57013, is illustrated. In the figure, a recording medium 1, such as an optical disk, consisting of a number of recording tracks 10 is provided for data memory element. A light source 11 which is generally a semiconductor laser is also provided for generating a light beam 16. Between recording medium 1 and light source 11, a condensing lens 14, a holographic beamsplitter 13, and a diffraction grating 12 are aligned in parallel. Light beam 16 emitted from light source 11 is diffracted by diffraction grating 12 into three light beams. Each of the diffracted light beams passes through holographic beamsplitter 13 and condensing lens 14 and then shines on recording tracks 10 of recording medium 1. Three light beams reflected from recording tracks 10 of recording medium 1, reversely, pass through condensing lens 14 and are diffracted by holographic beam splitter 13 which causes them to change their direction to a photodetector 15 rather than light source 11.

Since the holographic beamsplitter and the diffraction grating are provided individually, the number of device elements is increased and more alignment tasks are required for the aforementioned optical pickup device. In this respect, it is desirable to have optical pickup devices having a single diffracting element which implements the functions of both the holographic beamsplitter/focus error generating device and the diffraction grating for generating the satellite beams used in track following. For example, the device structure illustrated in FIG. 2 (prior art), which has been disclosed in U.S. Pat. No. 5,111,449, consists of a recording medium 1, a light source 21, a diffracting means 22, lens 23 and 24, and a detector 25. There are a number of parallel tracks 10 on recording medium 1. A partition line defines diffracting means 22 into a first region 22a and a second region 22b. First region 22a has a diffraction grating for diffracting a light beam 26 from light source 21 into three beams A1, A2, and A3 toward recording medium 1 through lens 23 and 24. Beams A1, A2, and A3, which are a +1 order, a −1 order and a zero-order light beam respectively, shine on points P1, P2, and P3 of recording medium 1. Then their reflected light beams B1, B2, and B3 from recording medium 1 are diffracted by second region 22b of diffracting means 22 toward detector 25.

However, main light beam A3 of the optical pickup device is a combination of two zero-order light beams which are diffracted by first region 22a and second region 22b of diffracting means 22. The two regions will affect the intensity of the two halves of zero-order diffracted beam A3 in different ways thereby disturbing its ideal beam profile. Since the zero-order diffracted beam is used for the most critical function in the pickup head, namely reading the information stored on medium 1, its beam quality should not be degraded. Thus, a shortcoming of the approach depicted in FIG. 2 (prior art) is that it will affect the beam quality of the zero-order beam A3 and therefore degrade the quality of the information signal read by the pickup. Moreover, since only one half each of the reflected beams B1–B3 is diffracted toward detector 25, the round-trip efficiency from laser to detector is poor. As such, the optical pickup device has to be provided with a higher power light source to overcome this problem. Therefore, the pickup device consumes more power, requires more device space and is more expensive to manufacture.

SUMMARY OF THE INVENTION

Accordingly, the present invention provides an optical pickup device and specifically, a new design for the single-surface holographic optical element which implements both the functions of holographic beamsplitter/focus error generating element and the diffraction grating for generating the satellite beams used in track following without disturbing the ideal beam profile of the zero-order diffracted beam that reads the information from the disk and which maintains high round-trip efficiency by diffracting the complete reflected beams towards the detector.

The optical pickup device of the present invention includes a lighting source, a condensing apparatus, a diffracting means, and a light detector. The light source generates and emits a light beam to the diffracting means. The diffracting means includes a center region and an outer region which encloses the center region. As the light travels from the light source towards the optical storage medium the main zero-order beam which reads the information on the disk encounters only the center region of the diffracting means while the two sub-beams used for track following are created as +1 and −1 diffraction orders from the outer region of the diffracting means. The three beams reflected from the recording medium all pass through the center region of the diffracting means and are diffracted in the direction of the detector therefrom. The light detector consists of multiple detector elements which convert the light that shines upon them after reflection from the recording medium into electronic signals containing the information that was recorded on the medium.

BRIEF DESCRIPTION OF THE DRAWINGS

Other objects, features, and advantages of the present invention will become apparent from the following detailed description of the preferred but non-limiting embodiments. The description is made with reference to the accompanying drawings in which.

DETAILED DESCRIPTION OF THE PREFERRED EMBODIMENTS

Figure 1:
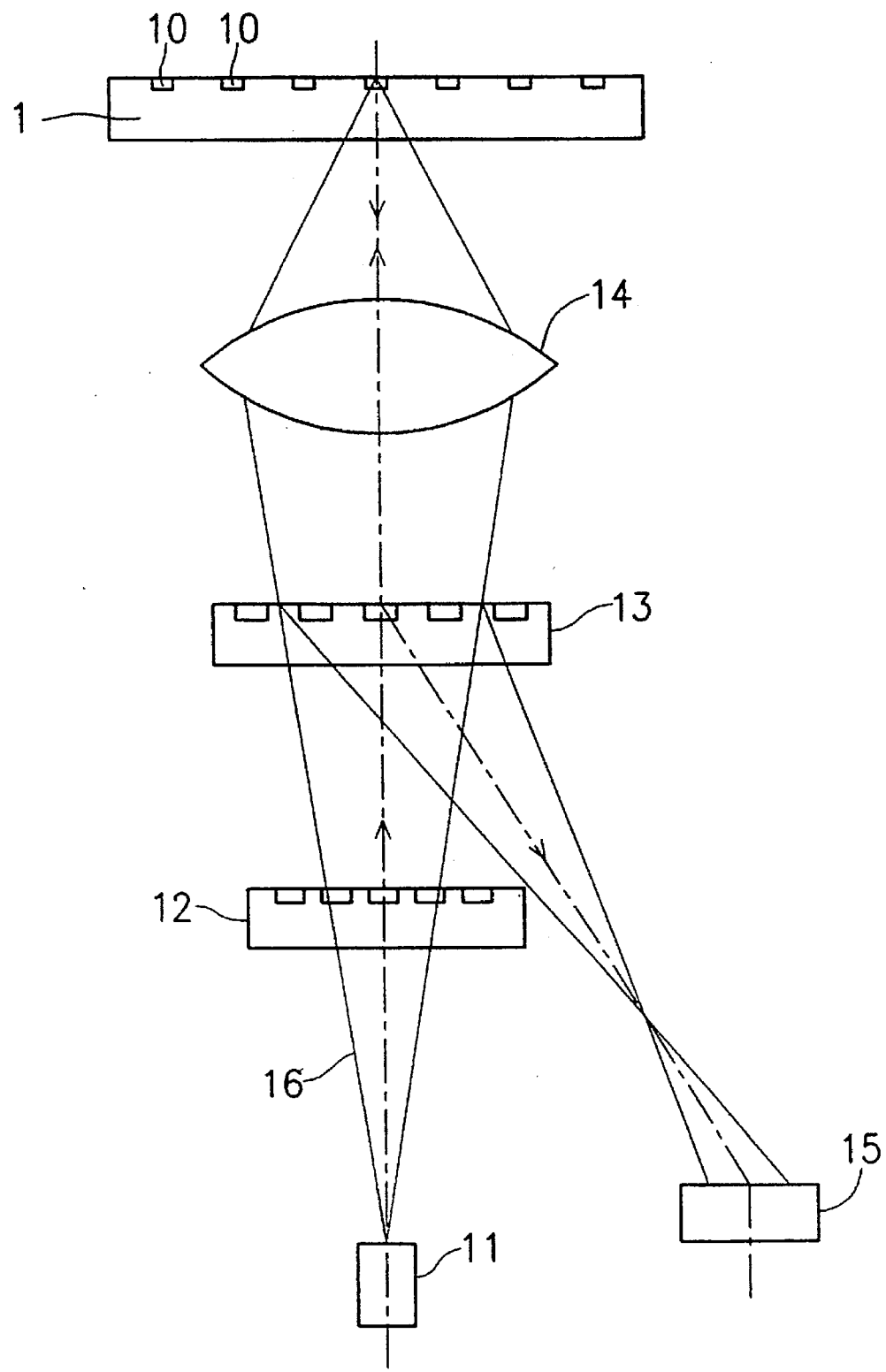
FIG. 1 (prior art) illustrates a prior art optical pickup device similar to that disclosed in Japanese Application Laid-Open No. 56-57013.
Figure 2:
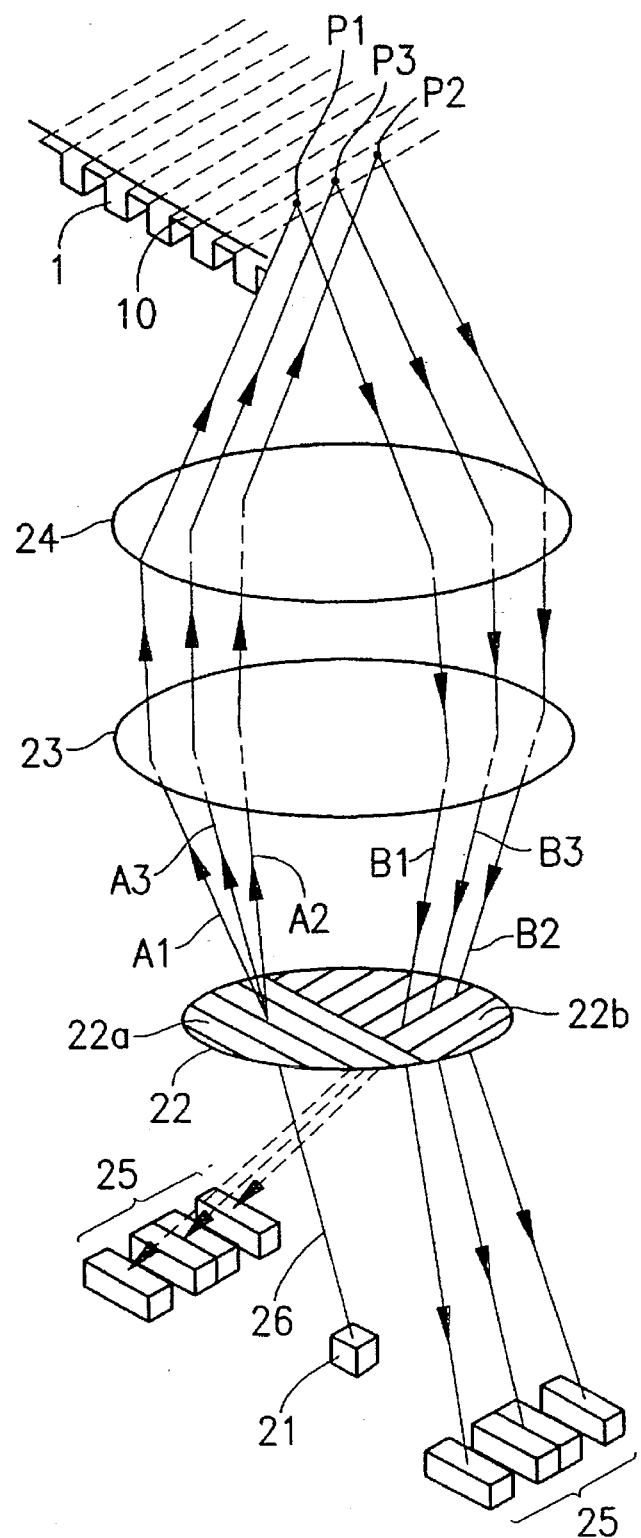
FIG. 2 (prior art) illustrates a prior art optical pickup device similar to that disclosed in U.S. Pat. No. 5,111,449.
Figure 3:
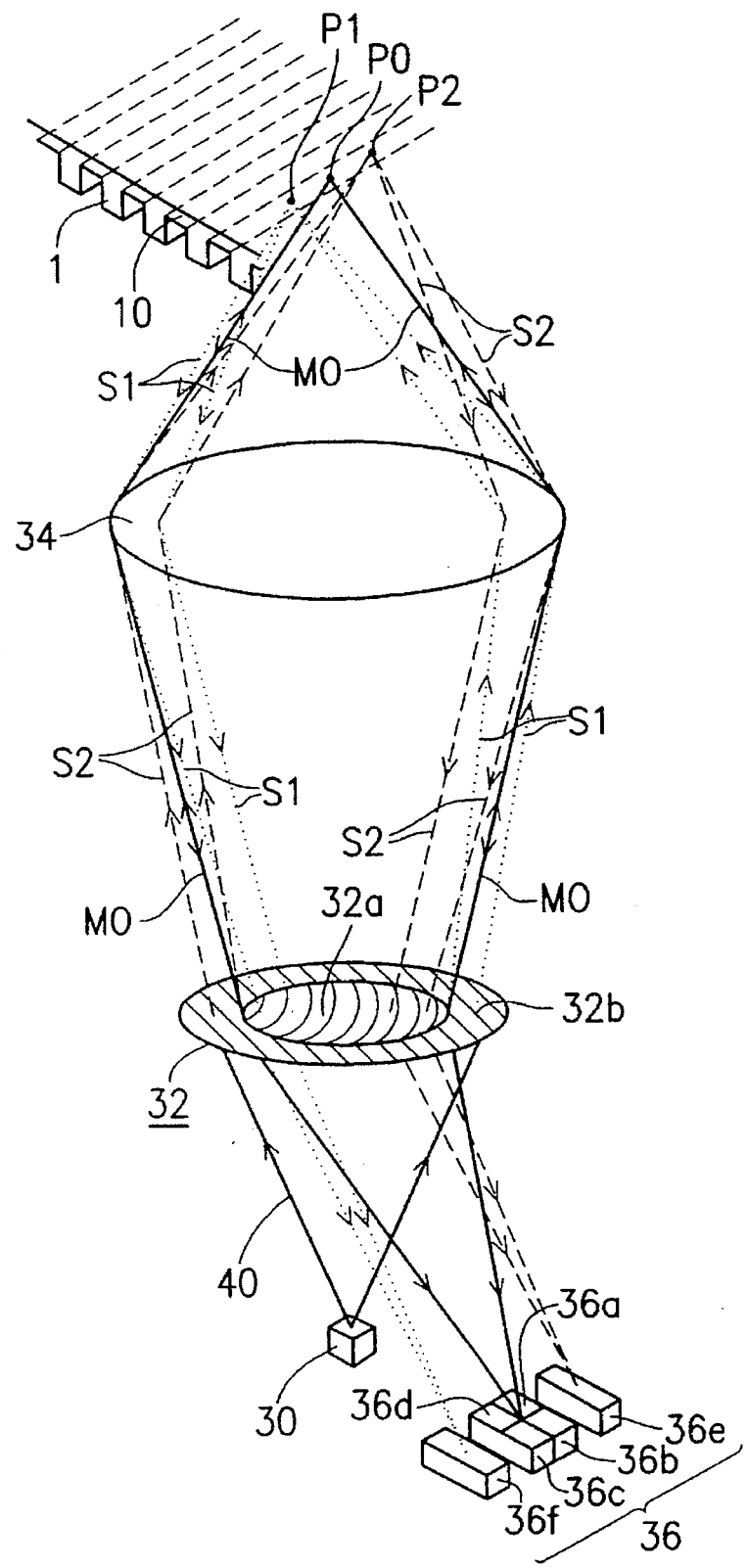
FIG. 3 illustrates an optical pickup device according to the first preferred embodiment of the present invention.

The apparatus structure according to the first preferred embodiment of the present invention is illustrated in the schematic diagram of FIG. 3. The optical pickup device is provided for reading an information signal IS, a focus error signal FES and a tracking error signal TES, from tracks 10 on recording medium 1 which can be an optical disk. As shown in the figure, the optical pickup device includes a light source 30, a diffracting means 32, a condensing apparatus 34 and a light detector 36.

Light source 30, which can be a laser diode, generates and emits laser beam 40 toward diffracting means 32. Laser beam 40 is diffracted into a main light beam M0 by the center region 32a and two sub-beams S1 and S2 by the outer region 32b of diffracting means 32. Condensing apparatus 34, which consists generally of a lens, condenses and focuses main beam M0 and sub-beams S1 and S2 to recording medium 1 and also focuses their reflected light beams from recording medium 1 towards diffracting means 32.

The reflected light beams of main beam M0 and sub-beams S1 and S2 are diffracted by the center region 32a of diffracting means 32 and then detected by light detector 36. Light detector 36, which may be composed of a number of photodiodes, detects the light beams. The information signal IS, focus error signal FES and tracking error signal TES, are derived from adding and subtracting the outputs of the individual photodiodes. In particular, the TES is derived by letting the sub-beams S1 and S2 each fall on separate photodiodes and then taking the difference between the signals from these two photodiodes.

Figure 4:
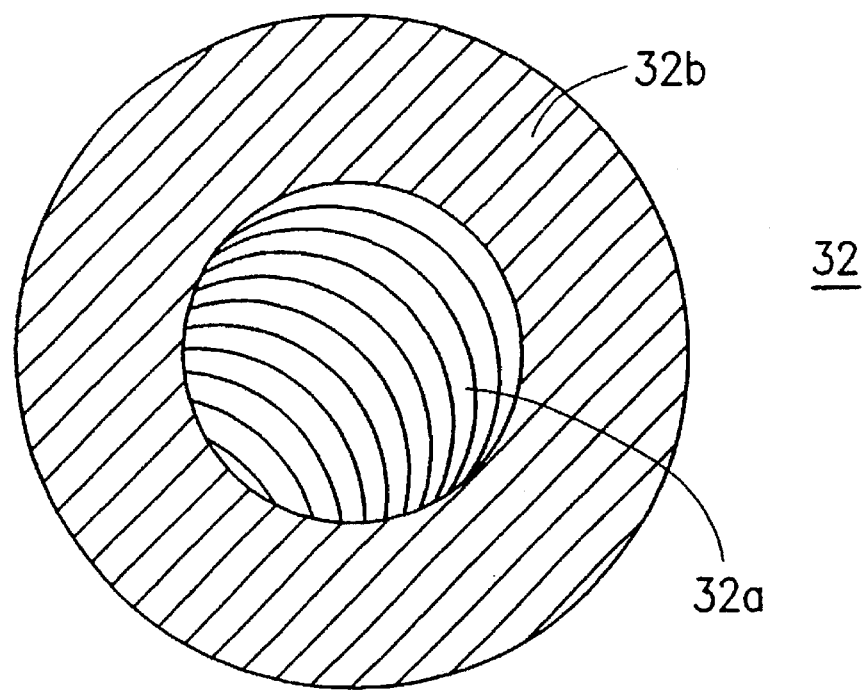
FIG. 4 is a top view of the diffracting means depicted in FIG. 3.
Figure 5:
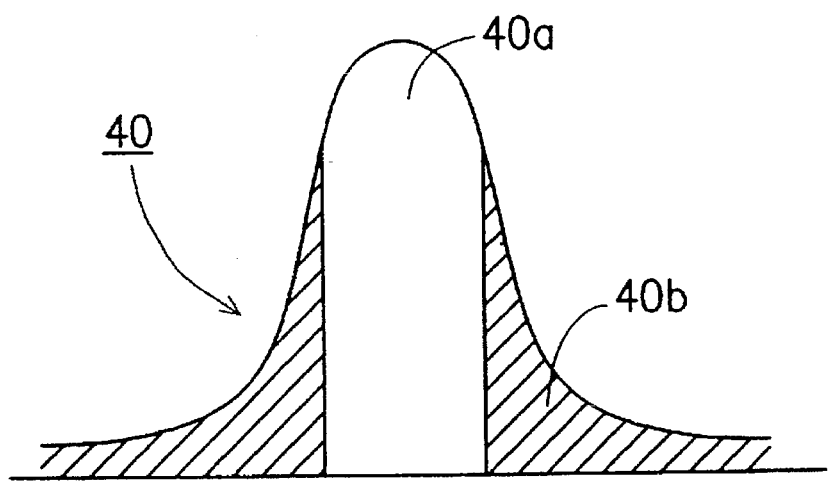
FIG. 5 illustrates the intensity distribution of the incident light in the optical pickup device of FIG. 3.

FIG. 4 is a top view of diffracting means 32. Referring to FIG. 4, diffracting means 32 can be a holographic optical element (HOE) which consists of a center region 32a and an outer region 32b. The zero-order diffracted beam, created by incident beam 40 passing through center region 32a becomes the main reading beam M0 incident on the recording medium. The size and shape of center region 32a is determined by the cone whose apex is at the light source 30 and whose rim is the clear aperture of the condensing lens 34. The size of the center region 32a is generally the union of all points within this cone where it intersects the surface of diffracting means 32 when the condensing lens 34 is moved to all positions it may normally assume during pickup operation. The exact size may vary slightly from this to simplify manufacturing. The outer region 32b encloses center region 32a to create sub-beams S1 and S2 from light that would normally not pass through the condensing lens 34. The light intensity distribution of incident light 40 is depicted in FIG. 5. The center portion of the incident light shown in region 40a of FIG. 5 represents the light that is emitted by the light source and passes through the clear aperture of the lens. This is the light that makes up main beam M0 in the present invention. Typically, the light outside this portion, i.e., the tails indicated as 40b in FIG. 5 is light that is wasted. In the present invention, the outer region 32b of diffraction means 32 is a diffraction grating that is intercepted by the light from portions 40b and diffracted to change the direction of this light so that some of it goes through the condensing lens 34 and creates the sub-beams S1 and S2 on the recording medium. The grating of the outer region 32b is oriented so that S1 sits just above an information track and S2 sits just below an information track when the main beam M0 is positioned correctly on an information track. After reflection from the disk, all three beams, M0, S1 and S2 pass through the center region 32a of diffracting means 32 and are diffracted onto light detector 36.

Figure 6:
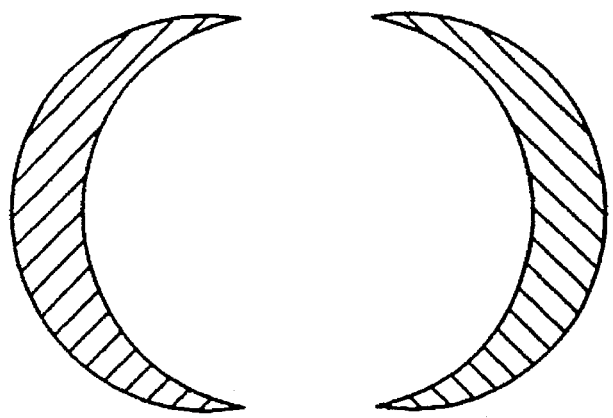
FIG. 6 illustrates the projection pattern of the incident sub-beams on the diffracting means of FIG. 4.
Figure 7:
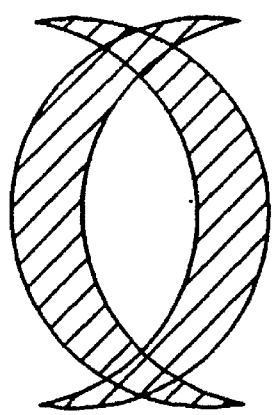
FIG. 7 illustrates the projection pattern of the reflected sub-beams on the diffracting means of FIG. 4.
Figure 8:
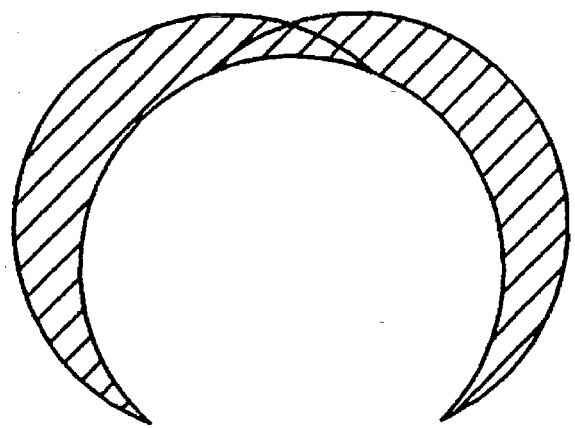
FIG. 8 illustrates the projection pattern of the incident sub-beams on the diffracting means of FIG. 4 when the lens has been moved far off axis as might happen in track following.
Figure 9:
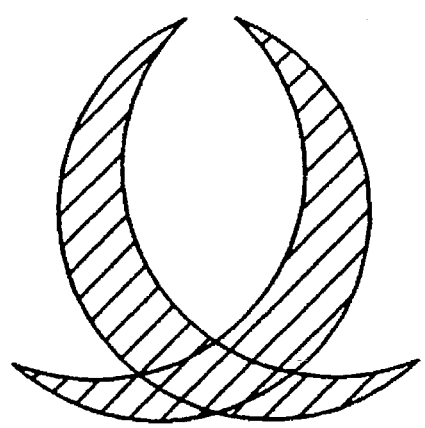
FIG. 9 illustrates the projection pattern of the reflected sub-beams on the diffraction means of FIG. 4 when the lens has been moved far off axis as might happen in track following.

The diffracting effect to the sub-beams according to the optical pickup device of the present invention will be more apparent by examining the projection patterns of the sub-beams on diffracting means 32 as illustrated in FIG. 6 through FIG. 9. FIG. 6 illustrates the projection pattern of the sub-beams from the light source 30 on diffracting means 32. In other words, these are the regions of the incident light on diffracting means 32 that will pass through the condensing lens and become sub-beams S1 and S2 after being diffracted by the grating in region 32b. FIG. 7 shows where the sub-beams will intersect diffraction means 32 after reflection from the recording medium. FIGS. 8 and 9 show the patterns of light on the surface of diffracting means 32 when the lens has been moved far off axis as it might be for track following. FIG. 8 shows the regions of light from the light source that will become sub-beams S1 and S2 while FIG. 9 shows where the sub-beams will intersect the diffracting means after reflection from the recording medium.

Referring again to FIG. 4, center region 32a of diffracting means 32 is a HOE in which the astigmatic detection method for focus error is applied. Outer region 32b of diffracting means 32 has grating lines essentially perpendicular to the tracks 10 of recording medium 1. Since the astigmatic detection method is applied in the central region 32a of diffracting means 32, light detector 36 has to be composed of six photodiodes 36a, 36b, 36c, 36d, 36e, and 36f. These photodiodes generate varying output currents in accordance with the intensity of light beams they sense. If the output currents of photodiodes 36a, 36b, 36c, 36d, 36e, and 36f, are IA, IB, IC, ID, IE, and IF respectively, the information signal IS can be obtained from $$IS=IA+IB+IC+ID,$$

the focus error signal FES is $$FES=IA+IC-IB-ID,$$

and the tracking error signal TES is $$TES=IE-IF.$$

Figure 10:
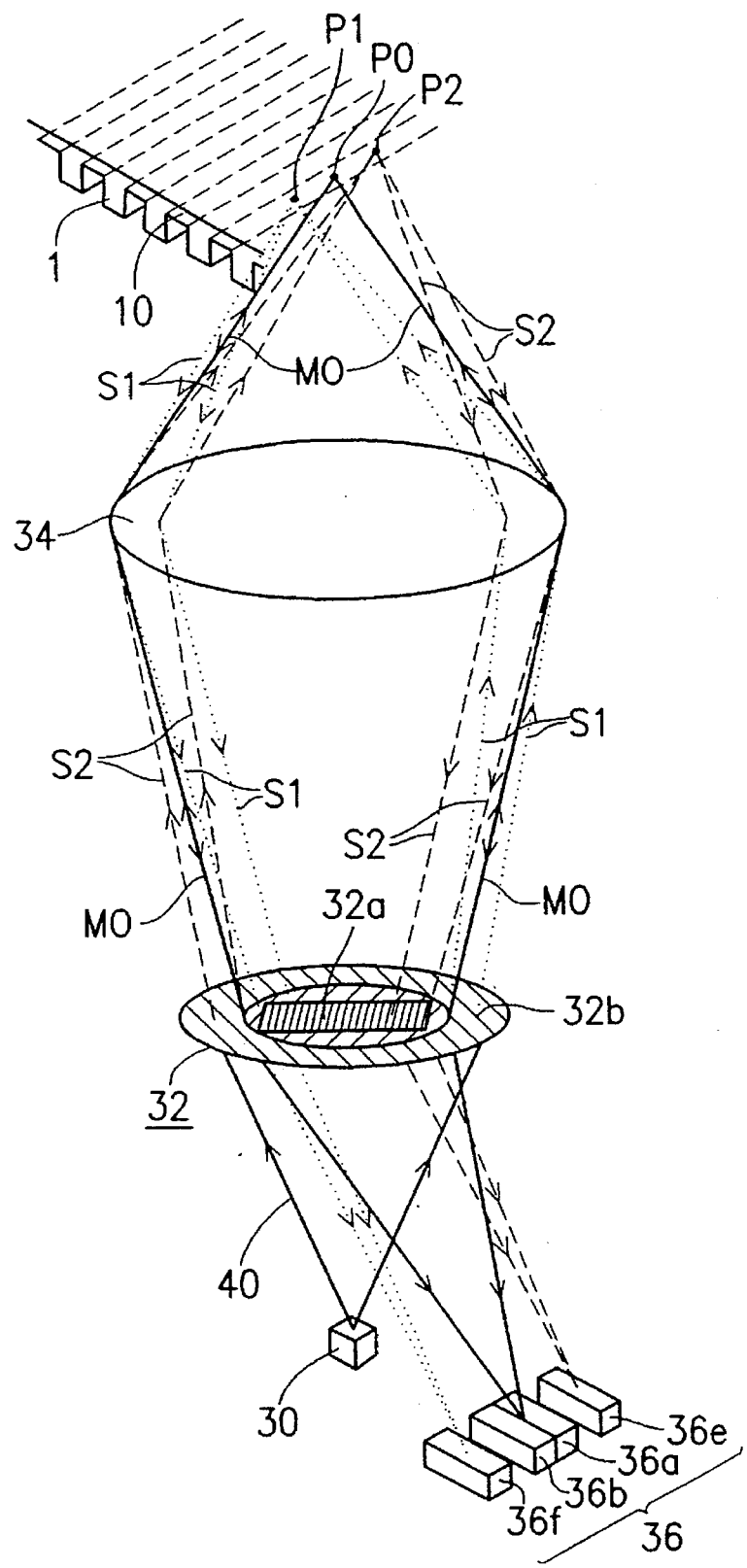
FIG. 10 illustrates the device structure of the second embodiment of the present invention.
Figure 11:
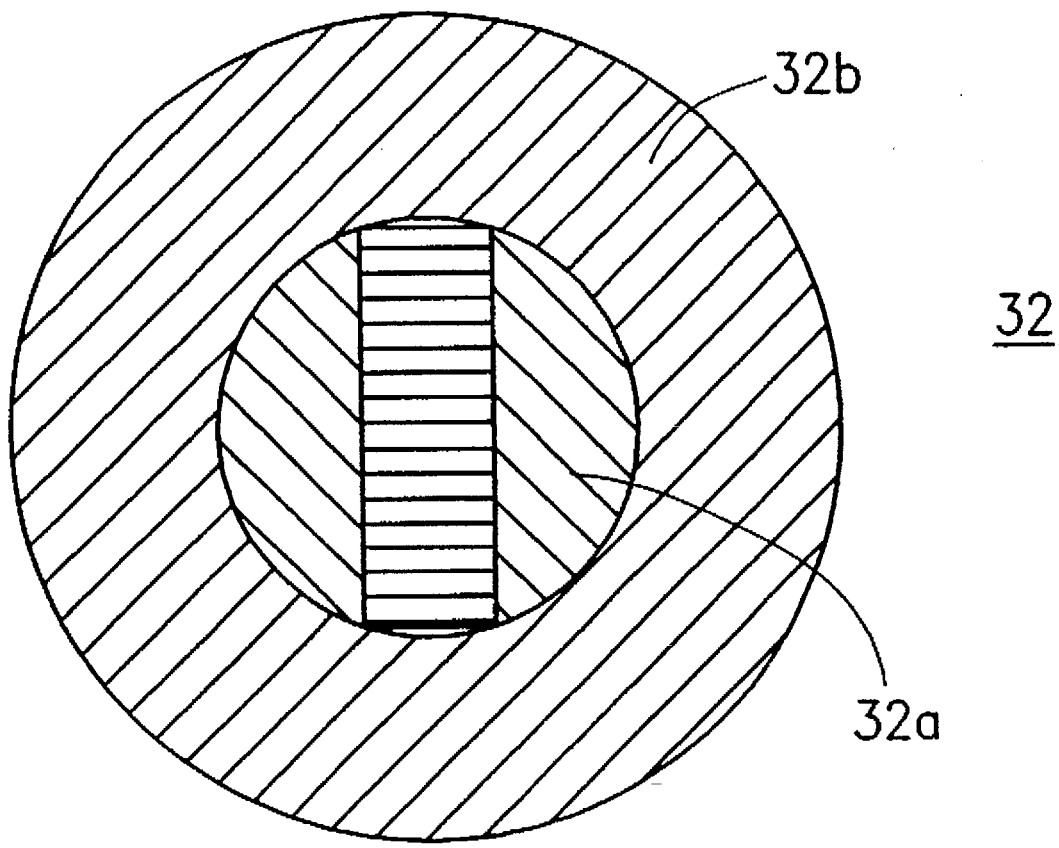
FIG. 11 is a top view of the diffracting means depicted in FIG. 10.

The second embodiment of the present invention is illustrated in FIG. 10. Since the optical pickup device of the second embodiment has a structure similar to that of the first embodiment, the same numerals are applied in the figure. The second embodiment has a spot size detection method for focus error signal generation designed into center region 32a of diffracting means 32 one version of whose top view is depicted in FIG. 11. Since the spotsize detection method is applied, light detector 36 can be composed of four photodiodes 36a, 36b, 36e, and 36f where, depending on the implementation of spotsize detection, 36a and 36b may or may not each be sets of photodetectors. Output currents of photodiodes 36a, 36b, 36e, and 36f, are IA, IB, IE, and IF respectively. In this case, the information signal IS can be obtained from $$IS=IA+IB,$$

the focus error signal FES is $$FES=IA-IB,$$

and the tracking error signal TES is $$TES=IE-IF.$$

Figure 12:
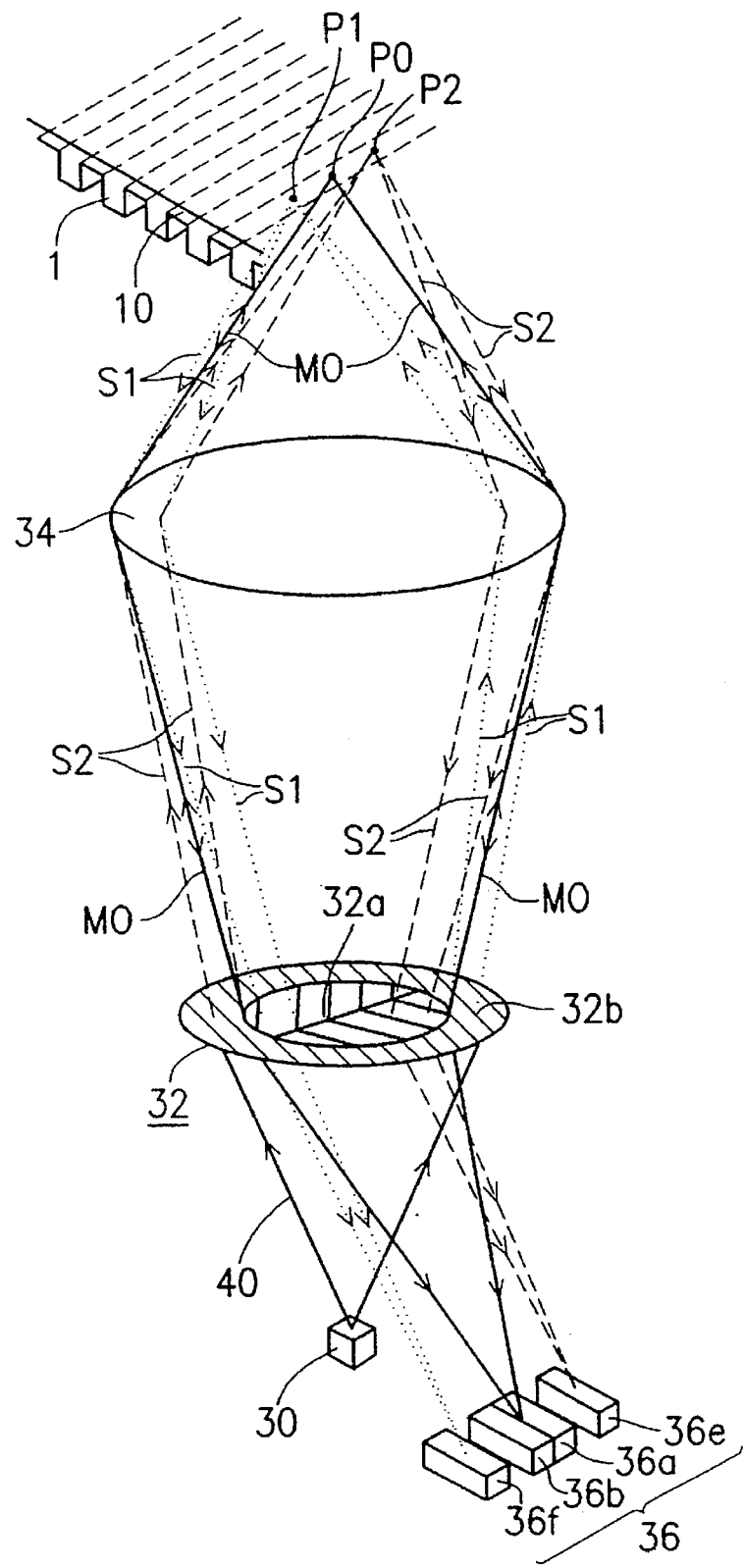
FIG. 12 illustrates the device structure of the third embodiment of the present invention.
Figure 13:
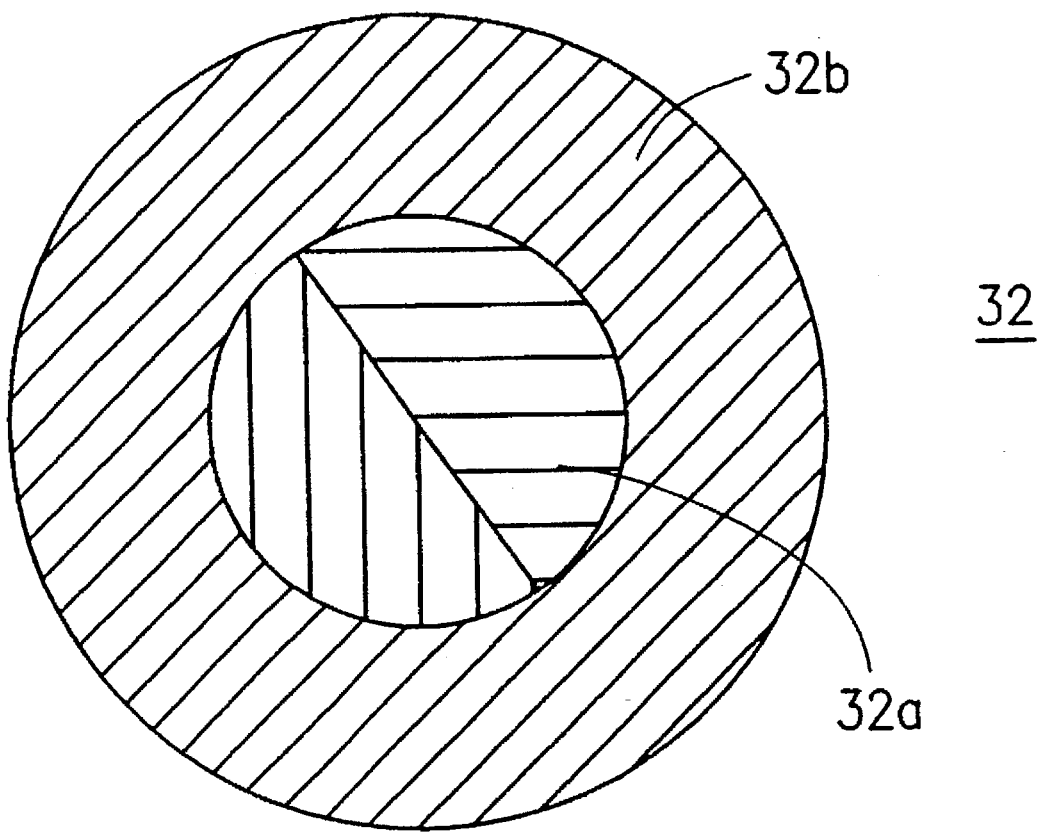
FIG. 13 is a top view of the diffracting means depicted in FIG. 12.

Further referring to FIG. 12, wherein the third embodiment of the present invention is illustrated, the optical pickup device shown in the figure is similar to those of FIGS. 3 and 10, and thus the same numerals are applied. In the third embodiment, a knife edge detection method for focus error is designed into the center region 32a of diffracting mmeans 32. FIG. 13 illustrates the top view of diffracting means 32. Similarly, as shown in FIG. 12, light detector 36 in the third embodiment can be composed of four photodiodes 36a, 36b, 36e, and 36f. Therefore, if output currents of the four photodiodes are IA, IB, IE, and IF respectively, the information signal IS can be obtained from $$IS=IA+IB,$$

the focus error signal FES is $$FES=IA-IB,$$

and the tracking error signal TES is $$TES=IE-IF.$$

The number of elements in the optical pickup device and assembly alignment complexity can be reduced by using a single-surface diffracting means both for the HOE beamsplitter/focus error generating element and for creating the two sub-beams for use in track following. By implementing both in a single-surface HOE, the production of this component is also simplified. Furthermore, the element design in the present invention does this without disturbing the ideal beam profile of the zero-order diffracted beam that reads the information from the disk and it maintains high round-trip efficiency by diffracting the complete reflected beams towards the detector thus providing superior performance to the prior art.

What is claimed is:

1. An optical pickup device for reading data on a data recording medium, said optical pickup device comprising:

a light source for emitting a light beam;

a condensing apparatus for condensing said light beam;

a diffraction means including a center region and an outer region, said center region producing a zero diffraction order light beam from the light traveling from said light source to said recording medium giving rise to a main beam and acting as a beamsplitter and focus error generating element for the light that is reflected from said recording medium, said outer region acting to deflect light from the light source into the condensing apparatus and producing a +1 diffraction order light beam and a −1 diffraction order light beam from the light traveling from said light source towards said recording medium thereby creating two sub-beams which are utilized for track following, said outer region being only intersected by light that would not otherwise pass through said condensing apparatus if undeflected and said outer region being not intersected by the light reflected from said recording medium; and a light detector for detecting said main beam and said sub-beams reflected from said data recording medium through said diffracting means.

2. The optical pickup device as claimed in claim 1, wherein said diffracting means is a holographic optical element.

3. The optical pickup device as claimed in claim 2 wherein said outer region of said diffracting means has grating lines perpendicular to tracks of said data recording medium.

4. The optical pickup device as claimed in claim 2 wherein astigmatic detection for focus error is applied to said center region of said diffracting means.

5. The optical pickup device as claimed in claim 2 wherein knife edge detection for focus error is applied to said center region of said diffracting means.

6. The optical pickup device as claimed in claim 2 wherein spot-size detection for focus error is applied to said center region of said diffracting means.

\* \* \* \* \*